United States Patent Office 2,962,406
Patented Nov. 29, 1960

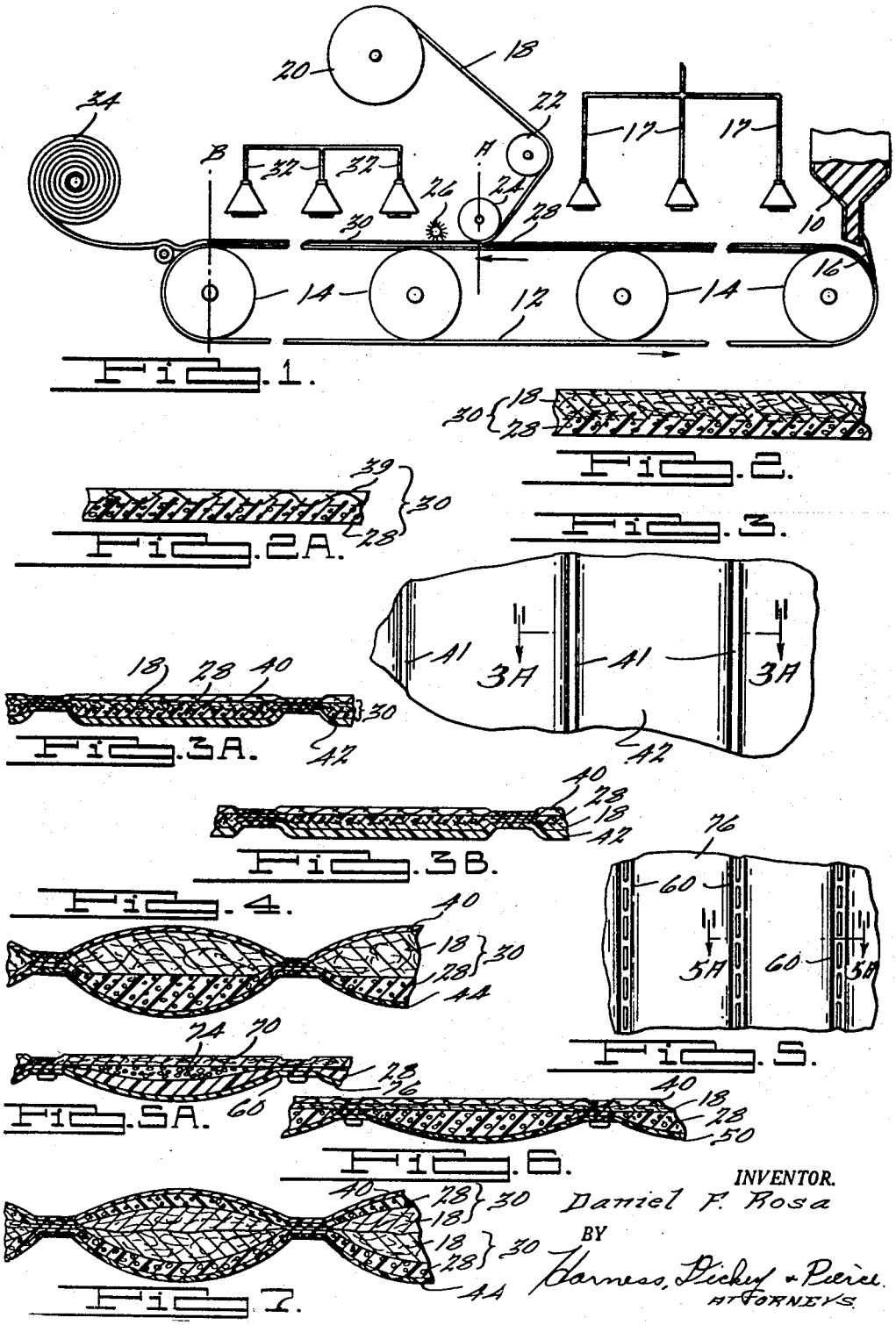

2,962,406
METHOD OF MAKING UPHOLSTERY MATERIALS

Daniel F. Rosa, Detroit, Mich., assignor to Detroit Gasket & Manufacturing Company, Detroit, Mich., a corporation of Michigan Filed Aug. 15, 1955, Ser. No. 528,359

2 Claims. (Cl. 154—100)

The present invention relates generally to upholstery materials and a method of making same. More specifically the invention relates to a laminar padding material and method of making same and to novel, laminar upholstery materials containing such laminar padding material.

In the upholstering of automobiles it is customary to construct the usual seats by securing padding over a spring structure and then securing a fabric material over the padding. In recent years the use of latex foam rubber as a seat padding material has become quite common. It is quite difficult to satisfactorily anchor a fabric material over a smooth layer of foam rubber padding without the fabric eventually stretching to cause an unsightly slack condition. The difficulty here has been insufficient body and structural resilience and rigidity in the usual upholstery finish fabrics.

It also has become more common to impart an embossed or quilted effect to the surface of seats, scuff and trim panels, and the like. On auto seats this has led to the use of a material having what is sometimes referred to as a "stuffed-pleat" construction. Such material is made by placing a layer of a padding material between a backing sheet and an upper sheet of an upholstery finish fabric, leather, plastic, and the like and sewing a pattern through all three layers. In others buttons, decorative fasteners, etc. are secured in a decorative pattern through all three layers. Up to the present this type of quilted or stuffed-pleat upholstery has been expensive due to the number of hand operations involved in its manufacture and it has been difficult to obtain a uniformly well-filled material due to the inherent non-uniformity of most padding materials and the difficulty in anchoring them in place. When working with plastic materials thread stitching, button-type fasteners, etc. have a tendency to tear out of the plastic and ruin the appearance and utility of the material.

It is among the objects of this invention, therefore, to provide a new and useful padding or bolster filler material which by reason of its inherent uniformity and ability to be heat-sealed more readily lends itself to being incorporated in a wide variety of upholstering and padding or filling applications; to a method of making such padding or filler material; to provide a laminar padding material of this type to which a wide variety of fabrics, leather, plastic simulated leathers, and other upholstering finishing materials may be secured for the purpose of imparting body, resilience and strength to the latter; and to provide novel, useful laminar upholstery constructions containing such laminar padding or filler materials including a variety of embossed, quilted or "stuffed-pleat" constructions having improved appearance and "feel," greater strength, great abrasion resistance, greater and more uniform resilience, and the other desirable properties. Other objects and advantages will be apparent, or will become apparent in the following more detailed description of the invention taken in conjunction with the accompanying drawings.

In the drawings:

Figure 1 is a schematic view in elevation of an illustrative apparatus useful in producing the laminar padding or filler material of this invention;

Fig. 2 is an enlarged cross section through an illustrative laminar padding material of the present invention having a porous mat of fibers partially embedded in a vinyl sponge layer and which was made on the apparatus of Fig. 1;

Fig. 2A is a view similar to Fig. 2 of a second laminar padding material made on the apparatus of Fig. 2, the material in this case having a layer of an upholstery finish fabric partially embedded in the vinyl sponge layer;

Fig. 3 is a fragmentary plan view of an illustrative composite upholstery material embodying the laminar padding or filler material of Fig. 2;

Fig. 3A is an enlarged sectional view through the material of Fig. 3, the section being taken along the line 3A—3A of Fig. 3;

Fig. 3B is a view similar to Fig. 3A but showing the sponge-fiber laminar padding material reversed therein with respect to the backing and upper layers;

Fig. 4 is a view similar to that of Figs. 3A and 3B showing a similar construction wherein a relatively thick wool mat is employed;

Fig. 5 is a fragmentary plan view similar to that of Fig. 3 showing another composite upholstery material having a decorative seaming motif;

Fig. 5A is a sectional view through the material of Fig. 5 showing a laminar padding material containing a layer of comminuted cork adhered to a board-like backing, the view being taken along the line 5A—5A of Fig. 5;

Fig. 6 is a view similar to that of Figure 3A wherein a laminar padding material consisting of a sponge layer and a porous, fibrous layer has been adhered between a fabric backing layer and a plastic-covered fabric upper layer; and Fig. 7 is a view similar to that of Fig. 4 but showing two laminar padding layers each containing a thick wool fiber layer.

In accordance with the present invention a novel laminar padding material or bolster-filler material is provided comprising a layer of a vinyl resin sponge material in which is partially embedded a second layer of a resilient, porous padding material in the form of fibers or discrete particles of comminuted resilient material. The overlying second layer of padding material is permanently affixed to the sponge layer by actually being pushed into, or partially embedded in, the surface of the sponge layer so as to be locked thereto. A laminar padding material of this type has novel properties, most important of which is the ability to be heat-sealed to, or between, one or more layers of fabric, leather, plastic, paper, wood, etc. The vinyl resin of the sponge layer serves as its own heat-activatable adhesive whereby the laminar padding material, without the use of added adhesives, can be incorporated in a multitude of laminar filled upholstering constructions. When heat-sealed in this fashion the vinyl sponge material is liquefied or softened so that pressure forces the softened plastic through the second porous layer of fibrous or comminuted padding material and into contact with or into backing and surface layers so as to bind all in one integral seam. The resulting composite, laminar upholstery construction accordingly has unusual strength and integrity and will easily withstand the roughest usage without separating into the various layers. By properly proportioning the total thickness of the laminar padding material, and the relative thicknesses of the sponge and porous padding layers thereof, it is possible to obtain composite, patterned (or "stuffed-pleat") constructions of various thicknesses which are uniformly filled and which have the degree of resiliency desired.

In the production of the laminar padding material any discontinuous or porous material having resilience may be employed as the second padding layer which is embedded in the vinyl resin sponge substrate layer. Such layer must be porous so that the vinyl resin of the substrate can be forced through it. Thus, fabric or fibrous mats, bats, webs, felted forms, or other textile forms of cotton, rayon, nylon, Dacron, wool, jute, ramie, wood fiber, glass fiber, asbestos fiber and others, may be employed. If desired, these textile forms may contain a small proportion of a binder such as resin, rubber, starch, or other substances for added strength. Flocs or chopped fiber of any of these fibrous materials may also be dropped or blown and then pressed into the surface of the easily penetrated sponge layer. In like manner, comminuted solid, resilient materials such as ground cork, ground sponge rubber, ground vinyl sponge, and other similar comminuted, resilient materials may also be embedded in the partially fused sponge layer. In the case of flocs or comminuted materials, it is usually necessary to remove excess material not adhered to the resin by a gentle air blast or by passing a soft rotary bristle brush over the surface. The use of the second padding layer contributes added bulk to the composite material without materially affecting the resilience or feel of a finished product containing it. Thus, on a volume basis the highly desirable resiliency properties of vinyl sponge are obtained at a markedly lower cost. Moreover, where textile forms are employed in the second layer, the vinyl sponge is reinforced and made more resistant to abrasion and stretching and more amenable to stitching, fastening, and the like than a similar thickness of the same sponge alone.

The sponge-like substrate layer may be made from any plastisol or organosol formulation, although the plastisol type is much preferred. The resin component of such a formulation will usually be a high molecular weight polymer of vinyl chloride with or without minor proportions of other copolymerized monomeric materials such as vinylidene chloride, vinyl acetate, the alkyl acrylates such as methyl and ethyl acrylates, and others. The most commonly employed and most satisfactory plastisol resin is polyvinyl chloride. Plastisol resins, of course, are specially prepared polymers having a particle size and particle size distribution allowing the preparation of plastisol mixes of the desired viscosity and resin content. Plastisol resins are converted to the plastisol form by dispersing the finely-divided resin in a liquid plasticizer or mixture of plasticizers (usually from about 75 to about 200 parts of plasticizer per 100 parts of resin) along with greater or lesser proportions of stabilizers, fillers, pigments, blowing agents, gelling agents, and the like. Many of the commercially available plastisol resins may be so dispersed in the plasticizer by hand or simple mechanical mixing. A colloid mill may be employed if so desired. In any case, in order to obtain uniform pore size it is preferred to separate occluded air from the freshly mixed plastisol and this may be done by vacuum deaeration techniques. The resulting plastisol may be made in this manner in a range of viscosities (depending on the proportion and type of plasticizer or mixture of plasticizers) so that it can be poured or spread on a support in a layer or coating of the desired thickness by any convenient means such as by roller coating or dipping, or by a doctor blade, and the like. If a proportion of an inert, volatile solvent is employed, an organosol type composition is obtained which is of reduced viscosity and which may be useful in laying down the thinner coatings. Due to the fire hazards attendant on their use, however, organosols are not preferred.

An illustrative plastisol formulation found to have unusual utility and flexibility in the production of the laminar padding material of this invention is as follows:

| Material | Parts/Wt. |
| --- | --- |
| Polyvinyl chloride plastisol resin [1] | 90 |
| Polyvinyl chloride type resin [2] | 10 |
| G-53 Plasticizer [3] | 40 |
| G-62 Plasticizer [4] | 40 |
| Di-iso octyl phthalate plasticizer | 10 |
| Liquid, chlorinated paraffin plasticizer | 10 |
| Basic lead carbonate | 5 |
| Blowing agent [5] | 12 |

[1] "Geon 121" (B. F. Goodrich Chemical Co.).
[2] "Geon 202" (B. F. Goodrich Chemical Co.).
[3] A "polymeric type" plasticizer having a molecular weight of about 3300 (Rohm & Haas).
[4] An epoxy type plasticizer having a molecular weight of about 1100 (Rohm & Haas).
[5] p-p-oxybis-(benzenesulfonyl hydrazide).

The above materials were mixed by hand in a bucket, the bucket sealed and then placed on a 3-roll paint mill for continued mixing and to allow for separation of air.

In the above formulation "Geon 121" is a commercially-available, finely-divided plastisol form of high molecular weight polyvinyl chloride while "Geon 202" is a general purpose vinyl chloride polymer having a somewhat larger particle size than the usual plastisol resin. "Geon 202" is employed in the above formulation to decrease the initial viscosity below that usually obtained with 100 parts of plasticizer per 100 parts of plastisol resin and to obtain a soft, resilient fused product having less tackiness than if the "Geon 121" were used alone. The basic lead carbonate is a light and heat stabilizer. The mixture of polyester, di-iso octyl phthalate and chlorinated paraffin plasticizers was found to produce plastisol which was more fluid, had reduced tendency to migrate and which had a controlled solvating effect on the resin which enabled the blowing agent to properly perform its function and produce a uniform cell structure. The chlorinated paraffin plasticizer was utilized to reduce the flammability of the resulting sponge.

The laminar padding material of this invention is made by pouring or placing a layer or coating of a vinyl resin plastisol or organosol containing a blowing agent on a support such as a plate, continuous belt or mold and heating the layer or coating to initiate the simultaneous fusion (gelation) and blowing of the coating. When the fusion and blowing has been partially completed so that the surface of the partially blown and fused layer is somewhat soft, tacky and easily penetrated, the porous layer of fibrous or comminuted padding material is gently pressed into contact therewith to cause it to be partially embedded therein. The application of heat to the assembled layers is then continued to complete the fusion and blowing of the vinyl resin layer. After cooling, the composite material is then stripped from the support. The resulting product comprises a bolster filler or padding material containing two easily-discernible layers, one a continuous, light-weight, extremely resilient substrate layer of vinyl resin sponge and the other an overlying, porous layer of fibers or particles tightly locked to or embedded in the substrate.

The temperatures employed in the fusion and blowing of the vinyl substrate layer are conventional and it is preferred first to heat the plastisol or organosol layer gently at a temperature at, or just slightly above, the decomposition temperature of the particular blowing agent employed, and for a time conditioned on the thickness of the layer, to bring about an appreciable blowing before complete fusion or gelation sets in and the surface becomes impenetrable, and then, after the second porous padding layer has been applied, heating to a temperature to rapidly complete the blowing and gelatin. The temperature employed in the first stage of heating will depend to some extent upon the composition of the vinyl resin layer, its thickness and also upon the particular blowing agent being employed. With polyvinyl chloride resin and similar resins high in vinyl chloride content together with the plasticizers usually employed therewith in plastisol and organosol compositions, and employing p,p'-oxybis-(benzenesulfonyl hydrazide) or "BI-353" (Du Pont) as a blowing agent, temperatures in the first stage may vary from about 180 to about 230° F., while those in the second stage may vary from about 310 to about 360° F. The time in the first stage may vary from about 3 to about 10 minutes and that in the second stage from 1 to 5 minutes, both depending on the thickness of the layer and the type of heating employed. A heating period, for example for a layer or coating of plastisol of 0.010 inch in thickness, of two to three minutes in each stage will usually suffice. When this procedure is properly carried out it is usually possible to increase the volume of the plastisol substrate layer by a factor of about 10. Any method of heating may be employed such as infrared radiation, an electrostatic field, or indirect heating methods wherein the support or mold is heated by electricity, steam and the like.

If, in the above-described method, the second layer of padding material is applied to the freshly-deposited resin before heat is applied, the liquid or semi-liquid, viscous plastisol "wicks" or sinks into the porous padding layer, its cushioning effect will be lost, the uniformity and continuous nature of the substrate layer destroyed, and the subsequent blowing or expansion unduly interfered with. Likewise, if the second padding layer is applied after the sponge layer has "set" and its surface hardened so as to prevent the embedding therein of the fibers or particles, the two layers will not adhere satisfactorily. When the first stage gentle heating is properly carried out, however, there is an appreciable period of time wherein the partially blown and fused substrate layer is properly receptive to the second padding layer so that this period offers no difficulty in manufacture.

The pressure required to be exerted in order to partially embed the second padding layer into the partially fused sponge layer is very small and, of course, will vary depending on the thickness of the two layers, the degree of penetration or embedding desired, and on the degree of fusion of the resin layer. The very gentle pressure exerted by a rotary bristle brush or small idler roll resting lightly on top of the layers will usually be sufficient.

The above composition was employed in the apparatus indicated schematically in Fig. 1 of the drawings to produce a wide variety of laminar bolster filling or padding materials. The above platisol composition was placed in a doctor blade container 10 of the apparatus. A continuous belt 12 trained over rollers 14 passed under the blade 16 at the bottom of container 10. The blade 16 was set so as to lay down a uniform coating of about 0.007 inch in thickness on the belt. The belt, traveling in the direction indicated, passed under a series of first stage infrared heating lamps 17 which heated the coating and its support to a temperature of about 210 to about 230° F. The belt moved at a speed such that it required from about 2 to about 3 minutes to move the distance between the doctor blade 16 and the point A. In this distance the blowing and gelling of the plastisol was initiated such that it was no longer fluid and it was appreciably expanded, yet its surface could be penetrated to a certain extent. At point "A" a loose, fluffy mat 18 of mixed cotton and "Dacron" fibers was drawn from a supply roll 20, passed down over guide rollers 22, 24 and under a small pressure idler roll or brush 26 set so as to gently press the mat 18 into the surface of the as yet soft, easily penetrated and incompletely fused but substantially expanded plastisol sponge layer 28. The composite layers 30 then moved under a second battery of infrared lamps 32 which heated them to a temperature of about 350 to about 360° F. The belt and its adhered materials required from about 2 to about 3 minutes to traverse the distance through the second stage heating zone between points "A" and "B." By the time that the belt and its adhering layers had reached the left-hand roller 14 the belt and the layers had cooled appreciably. The plastisol sponge layer 28 and its adhering fibrous layer 18 was then easily stripped from the polished belt surface and wound up on a take-off roll 34. The resulting product shown in Fig. 2 was a thin, laminar padding material comprising a continuous layer 28 of vinyl resin sponge about 1/16 inch in thickness having integrally locked into its surface a fluffy mat 18 of fine fibers.

In a like manner, thicker coatings were laid down on the belt 12 so as to produce sponge layers 1/8" or even 1/4 to 1/2 inch in thickness. On some of these a course, loose mat of resin- or starch-bonded wool fibers having a thickness of about 3/16 inch was embedded in the manner described above. These laminar padding materials varied from as little as 1/8 inch to as much as 1/2 inch or more in total thickness.

A similar thin laminar product (shown in Fig. 2A) was prepared by substituting a layer 39 of woven upholstery finish fabric for the loose, fibrous mat 18 described above. The fabric could not be separated from the sponge layer. When used, as such, to cover a conventional auto seat the composite sponge-fabric material of Fig. 2A had more body, a smoother, heavier feel and did not bunch up or stretch. The sponge-fabric padding material could be heat-sealed directly to backing layers of various types to produce other types of laminar upholstery material and decorative scuff and trim panels.

The thin laminar padding material of Fig. 2 was employed to make an embossed, quilted or "stuffed-pleat" auto seat covering material shown in Figs. 3 and 3A. A backing sheet 40 of coarse muslin-like fabric known as "scrim" was first laid down on metal base plate, a sheet of the laminar padding maerial 30 then laid on top of the backing layer 40 with the vinyl sponge layer in contact with the layer 40 in one case (Fig. 3B) and the fiber layer 18 in contact with layer 40 in the other case (Fig. 3A), and a sheet 42 of colored plastic film laid thereover. An upper die was then brought down on top of the assembled layers with a moderate pressure sufficient to compress the assembled layers. The upper die consisted of a metal block having a plurality of straight, spaced-apart blades (having square edges about 0.060 inch in thickness) projecting therefrom so as to come in contact with the assembled layers at regularly-spaced intervals. An electrostatic field was then established between the upper die and the metal base plate for a matter of a few seconds in order to electronically "heat-seal" the layers together. When the finished product was cooled and removed from the dies it was found that, irrespective of the order of the layers, each of the upper die members had formed a straight seam 41 (Fig. 3) extending through all layers wherein the vinyl resin of the sponge layer 28 had been forced into the backing layer 40, through the fluffy, porous padding layer 18 and fused to the upper layer 42. So thoroughly fused and integral were the layers in the seams that the color of the plastic material of upper layer 42 was plainly visible in the seams when looking at the bottom side of the backing layer 40. The strength of the seams 41 was such that a pull at right angles to the seam of 8 to 10 lbs. or more per inch of seam was required to separate the various layers. When the die blades were 0.080 inch thick a force of 15 lbs. per inch was required to separate the layers and when the blades were .100 inch thick the force required was 20 lbs. per inch. Similar products made by heat-sealing employing a backing sheet 40, a layer of matted fibers 18 and a top sheet of plastic film, but without the vinyl sponge layer, exhibited a seam strength of less than 1 or 2 lbs. per inch (0.060 inch blades). Even when expensive heat-activatable adhesives were applied to or between the various layers it was not possible to obtain a significant improvement in strength. The product of this invention, moreover, was more fully and uniformly filled, was more resilient, and more pleasing in both appearance and "feel." It was admirably suited to use as an auto seat upholstery or covering material, especially when applied over sponge rubber base padding. In the latter use it would not stretch or "bunch up," rather its improved "body" and resilience enabled it to remain flat in contact with the sponge rubber seat cushion.

In a similar fashion, a laminar padding material similar to that described above in Fig. 2 was employed, as is shown in Fig. 6, as a filler between a fabric backing sheet 40 and an upper sheet 50 of plastic-coated fabric. Electronic heat effected a seal in which the vinyl resin was forced into the backing layer 40, through the fibrous layer 18 and into the fabric of layer 50 so as to be fused to the upper plastic surfacing thereof. As before, the seam strength between the layers was very high and the product had a fully-filled, more pleasant, smooth and resilient "feel." This material also could be used as a seat covering material.

A relatively thick laminar padding material such as was described above as being made from a thick wool mat 18 is shown in Fig. 4 to be incorporated in a quilted or "stuffed-plate" construction to produce a thick, resilient upholstery material such as would be satisfactory for crash pads or a shock-absorbing covering for instrument panels, and the like. As before, a sheet 40 of a coarse backing fabric, a sheet 30 of the laminar wool-sponge padding material in which the sponge was about ⅛ inch in thickness and the wool layer about ¼ inch in thickness, and a relatively heavy gauge upper sheet 44 of fabric-reinforced, plastic-covered simulated leather were employed. Again heat-sealing produced exceptionally strong, completely fused seams positively locking all layers together. An even thicker material of this same type is shown in Fig. 7 wherein two sponge-wool layers were employed. In this case the resin of the sponge layers was able to strike through two thick layers 18 of wool fibers to form integral seams wherein the vinyl resin penetrated the backing 40, the two wool layers 18 and the fabric backing of upper layer 44. So thick and resilient was this material that auto seat cushions could be made having the requisite resilience and softness by laying the material directly on the spring structure.

In still another laminar upholstery material shown in Figs. 5 and 5A, an upper die similar to that described above was employed to heat-seal through all layers. In this case the blade-like die members had their outer edges shaped to emboss a decorative stitching effect shown in Fig. 5 in the seams 60. In this case, as is shown in Fig. 5A, a backing layer 70 of stiff fiber board, a layer 28 of vinyl sponge having locked thereto a layer 74 of ground cork, and an upper layer 76 of plastic film were assembled in the order shown. After electronic heat-sealing it was found that the vinyl resin had been firmly adhered to the fiber board, penetrated through the cork layer 74 and fused to the plastic finish layer 76. The product was a resilient, firmly-cushioned structural panel admirably adapted for use as an auto scuff panel, auto door panel, and the like. When a hand was passed over the surface of the panel the presence of the ground cork was not discernible and the panel felt like it was filled with a thick layer of sponge. The layers of the panel, moreover, were difficult to pull apart.

What is claimed is:

1. The method of making upholstery material comprising spreading a vinyl plastisol composition containing a blowing agent in a uniform layer on a support, gently heating said layer to initiate the blowing and gelation thereof, applying to the exposed surface of said layer a second layer of a porous, resilient fibrous padding material, said second layer being applied while said first-named layer is in a partially fused condition in which said second layer will not appreciably sink into said exposed surface of its own weight, gently pressing said second layer into said surface with sufficient pressure to embed said padding material therein but insufficient to appreciably deform the partially fused said first-named layer, heating the resulting assembled layers to complete the fusion of said first-named layer, cooling said assembled layers, and stripping the resulting composite, laminar material from said support, said padding material being constituted so as to be penetrable substantially completely anywhere over its total extent by said first-named layer upon application of pressure and heat to said layers, thereafter disposing said composite laminar material between a pair of outer layers, applying pressure to the resulting assembly localized at spaced extended seams, and while continuing the application of said pressure subjecting all of the layers between said seams to a source of heat for a time sufficient to soften said first-named layer between each of said seams to cause the softened portions of said first-named layer to flow through said second layer so as to contact said outer layers at said seams, removing said source of heat and continuing the application of pressure for a time thereafter until said first-named layer resolidifies to a non-sponge condition to integrally bond all of said layers at each of said seams.

2. A method as claimed in claim 1 wherein said second layer of said padding material is composed of comminuted cork.

References Cited in the file of this patent

UNITED STATES PATENTS

| | | |
|---|---|---|
| 1,924,635 | Buffington | Aug. 29, 1933 |
| 1,990,937 | Forbes | Feb. 12, 1935 |
| 2,382,784 | Emery | Aug. 14, 1945 |
| 2,434,527 | Untiedt | Jan. 13, 1948 |
| 2,649,391 | Alderfer | Aug. 18, 1953 |
| 2,723,962 | Hedges et al. | Nov. 15, 1955 |
| 2,744,340 | Gerber | May 8, 1956 |
| 2,792,320 | Bower | May 14, 1957 |
| 2,879,197 | Muskat et al. | Mar. 24, 1959 |

FOREIGN PATENTS

| | | |
|---|---|---|
| 706,109 | Great Britain | Mar. 24, 1954 |

UNITED STATES PATENT OFFICE
CERTIFICATION OF CORRECTION

November 29, 1960

Patent No. 2,962,406

Daniel F. Rosa

It is hereby certified that error appears in the above numbered patent requiring correction and that the said Letters Patent should read as corrected below.

Column 5, lines 50 and 51, for "A continuous belt" read -- A continuous metal belt --.

Signed and sealed this 20th day of June 1961.

(SEAL)
Attest:

ERNEST W. SWIDER
Attesting Officer

DAVID L. LADD
Commissioner of Patents